(12) United States Patent
Nakamura (10) Patent No.: US 7,212,146 B2
(45) Date of Patent: May 1, 2007

(54) REMOTE CONTROL TRANSMITTER (75) Inventor: Takaya Nakamura, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 412 days.

(21) Appl. No.: 10/786,673

(22) Filed: Feb. 25, 2004

(65) Prior Publication Data
US 2004/0196621 A1    Oct. 7, 2004

(30) Foreign Application Priority Data
Mar. 3, 2003    (JP) .............................. 2003-055531

(51) Int. Cl.
*G08C 19/12* (2006.01)
(52) U.S. Cl. .................. 341/176; 429/96; 429/100
(58) Field of Classification Search .......... 429/96–100; 341/173, 176; 180/68.5; 361/726
See application file for complete search history.

(56) References Cited

U.S. PATENT DOCUMENTS

| | | | | |
|---|---|---|---|---|
| 2,975,226 A | * | 3/1961 | Lehr ............................ | 429/97 |
| 4,206,274 A | * | 6/1980 | Peels ........................... | 429/99 |
| 4,269,908 A | * | 5/1981 | Stemme ....................... | 429/98 |
| 4,391,883 A | * | 7/1983 | Williamson et al. .......... | 429/97 |
| 5,337,215 A | * | 8/1994 | Sunderland et al. ........ | 361/726 |
| 5,677,079 A | * | 10/1997 | DeZorzi ...................... | 429/99 |
| 5,843,595 A | * | 12/1998 | Kawakatsu ................... | 429/97 |
| 2002/0160255 A1 | * | 10/2002 | Babcock et al. .............. | 429/97 |

FOREIGN PATENT DOCUMENTS

JP    10-284030    10/1998

\* cited by examiner

Primary Examiner—Albert K. Wong
(74) Attorney, Agent, or Firm—RatnerPrestia (57) ABSTRACT

A control section with control keys arranged therein is formed, and upper and lower casings for storing a circuit, and holder capable of loading a button battery and sliding within said casing are respectively provided with stopping portion abutting each other when the holder is pulled out, and thereby, it is possible to obtain a remote-control transmitter which is free from dropping or losing of the holder.

5 Claims, 7 Drawing Sheets

REMOTE CONTROL TRANSMITTER

BACKGROUND OF THE INVENTION

1. Field of the Invention

The present invention relates to a remote-control transmitter used for remote control of various electronic apparatuses such as TV, video, and air conditioners.

2. Description of the Related Art

Recently, various electronic apparatuses such as TV, video, and air conditioners have been increasingly reduced in size and weight. And, in remote-control transmitters for remotely controlling these apparatuses, card types reduced in thickness and weight are widely used. Many of such remote-control transmitters employ disk-like button battery and are reduced in thickness and weight.

Such a conventional remote-control transmitter will be described with reference to FIG. 7.

Figure 7:
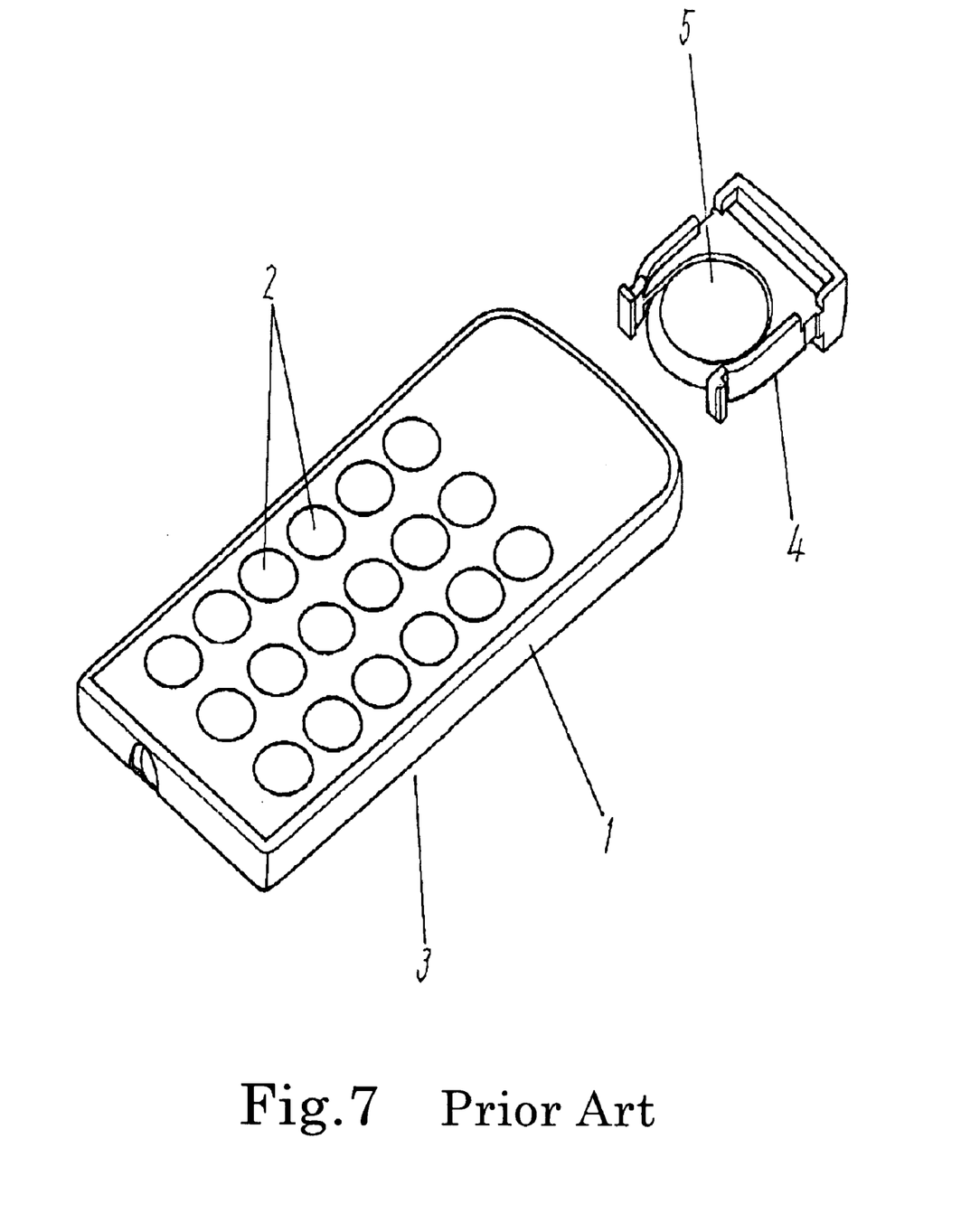
FIG. 7 is a perspective view of a conventional remote-control transmitter.

FIG. 7 is a perspective view of a conventional remote-control transmitter. In FIG. 7, control section 2 with a plurality of control keys arranged therein is formed on the surface of casing 1 made of synthetic resin. Also, each control key is protruded so as to be easily pushed. Inside the casing 1 is formed circuit 3. The circuit 3 comprises a printed circuit board and various electronic parts (not shown) mounted thereon. The circuit 3 generates and transmits remote control signals of infrared rays or the like for remote control of apparatuses.

Also, holder 4 made of synthetic resin is stored in the casing 1 and is detachable. Disk-like button battery 5 is disposed in the holder 4. The button battery 5 disposed comes in contact with an electrode (not shown) provided on the printed circuit board in the casing 1 and is connected to the circuit 3.

In the above configuration, when a specific control key of the control section 2 is pushed with the remote-control transmitter faced to an electronic apparatus, remote control signal of infrared ray corresponding to the key is transmitted from the circuit 3 to the electronic apparatus. Thus, for example, the power ON/OFF or the sound volume of the electronic apparatus can be remotely controlled by pushing the power control key or the sound volume control key.

Also, in case the button battery 5 is exhausted through long-time use, the holder 4 is removed from the casing 1 to replace the button battery 5. After that, the holder 4 is again inserted into the casing 1. The conventional remote-control transmitter is configured as described above.

Incidentally, as preceding technical information related to the present invention, for example, Japanese Patent Laid-Open Application H10-284030 is well-known.

However, in the above conventional example, when the button battery 5 is replaced, the holder 4 is removed from the casing 1, and the button battery 5 is replaced with the holder 4 removed from the casing 1. Accordingly, in the above example, there arises a problem that the holder 4 might be dropped and damaged or the holder 4 is liable to be lost while looking for new battery.

SUMMARY OF THE INVENTION

A remote-control transmitter has a holder and a casing which are respectively provided with stopping portion abutting to each other when the holder is pulled out. Due to such stopping portions, the holder is not completely detached from the casing and is stopped at the specified position. Accordingly, it is possible to obtain a remote-control transmitter which is free from dropping or losing of the holder during replacement of the battery.

Also, in the remote-control transmitter, the holder is rotatably supported in the casing. Thus, since the holder is rotatably supported in the casing, it is possible to prevent dropping or losing of the holder and to easily replace the battery.

Further, in the remote-control transmitter, an abutment on which the holder is abutted at a specified angle is provided between the holder and the casing. Thus, it is possible to keep the holder at the specified angle and to more easily replace the battery.

DESCRIPTION OF THE PREFERRED EMBODIMENTS

The preferred embodiments of the present invention will be described in the following with reference to FIG. 1 to FIG. 6.

(First Preferred Embodiment)

Figure 1:
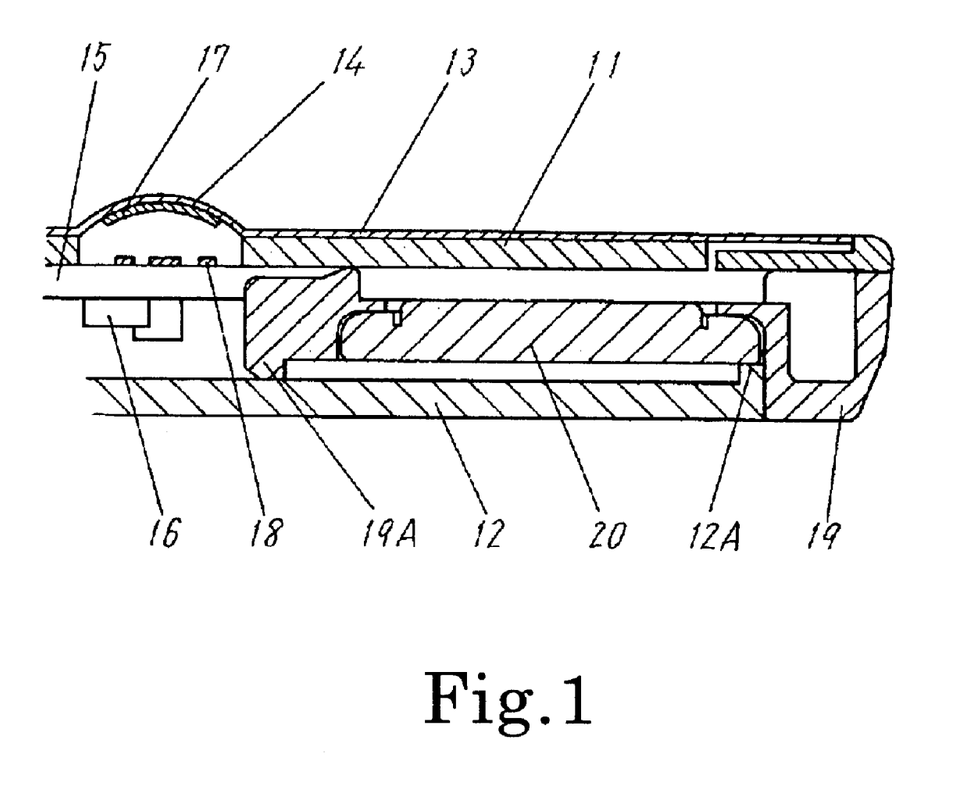
FIG. 1 is a side sectional view of a remote-control transmitter in the first preferred embodiment of the present invention.
Figure 2:
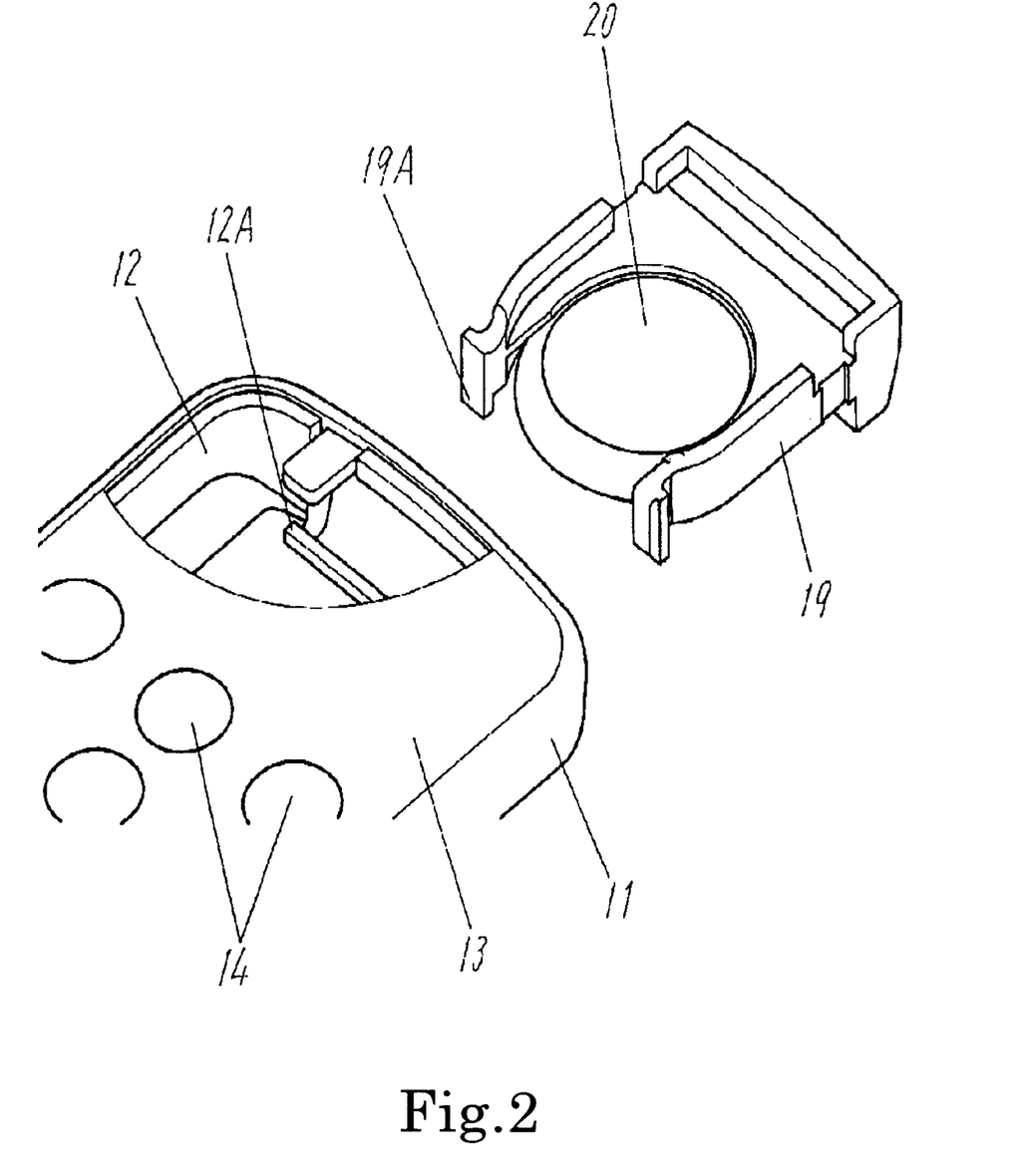
FIG. 2 is a partly sectional perspective view of the remote-control transmitter.

FIG. 1 is a side sectional view of a remote-control transmitter in the first preferred embodiment of the present invention. FIG. 2 is a partly sectional perspective view of the same. As shown in FIG. 1 and FIG. 2, upper casing 11 and lower casing 12 of the remote-control transmitter are integrated to form a casing. Also, panel 13 is bonded to the outer top surface of the upper casing 11. The upper casing 11 and the lower casing 12 are made of synthetic resin such as polystyrene, ABS, or the like. Also, the panel 13 is a film-like panel made of polyethylenetelephthalate or the like. The panel 13 is formed with control section 14 where a plurality of control keys are arranged. Also, each control key is protruded upward in dome-like shape.

And, in the upper casing 11 and the lower casing 12 is housed printed circuit board 15 made of paper-phenol or glass-contained epoxy with a plurality of wiring patterns (not shown) formed on the surface and underside thereof. Various electronic parts and the like mounted on the surface and underside configure circuit 16. The circuit 16 generates and transmits remote control signals of infrared ray or the like for remote control of apparatuses.

Also, movable contact 17 made of carbon or the like is formed on the underside of the control section 14. A plurality of fixed contacts 18 made of copper or the like are formed on the surface of the printed circuit board 15 opposed to the movable contact 17 with a specified space apart therefrom.

Further, holder 19 is installed in the lower housing 12 so that the holder 19 can be inserted into and pulled out with sliding. The holder 19 is made of synthetic resin such as polyoxymethylene, ABS, or the like. Disk-like button battery 20 is loaded in the holder 19. The button battery 20 disposed comes in contact with an electrode (not shown) disposed on the printed circuit board 15 and is electrically connected to the circuit 16.

And, the opening at the end of the lower casing 12 is provided with stopping portion 12A protruded upward from the inner bottom of the lower casing 12. Further, the holder 19 is provided with stopping portion 19A protruded downward in a direction opposite to the stopping portion 12A in an installed state of the holder 19.

In the above configuration, when a specific control key of the control section 14 is pushed with the remote-control transmitter faced to an electronic apparatus, the control section 14 resiliently deforms to make electrical connection and disconnection between movable contact 17 and fixed contact 18.

In this way, remote-control signal of infrared ray corresponding to the control key pushed is transmitted from the circuit 16 to the electronic apparatus. The remote control signal is received by a receiver (not shown) in the electronic apparatus. Thus, for example, when a power control key or a sound volume control key is pushed, the power ON/OFF or the sound volume of the apparatus is remotely controlled.

Figure 3:
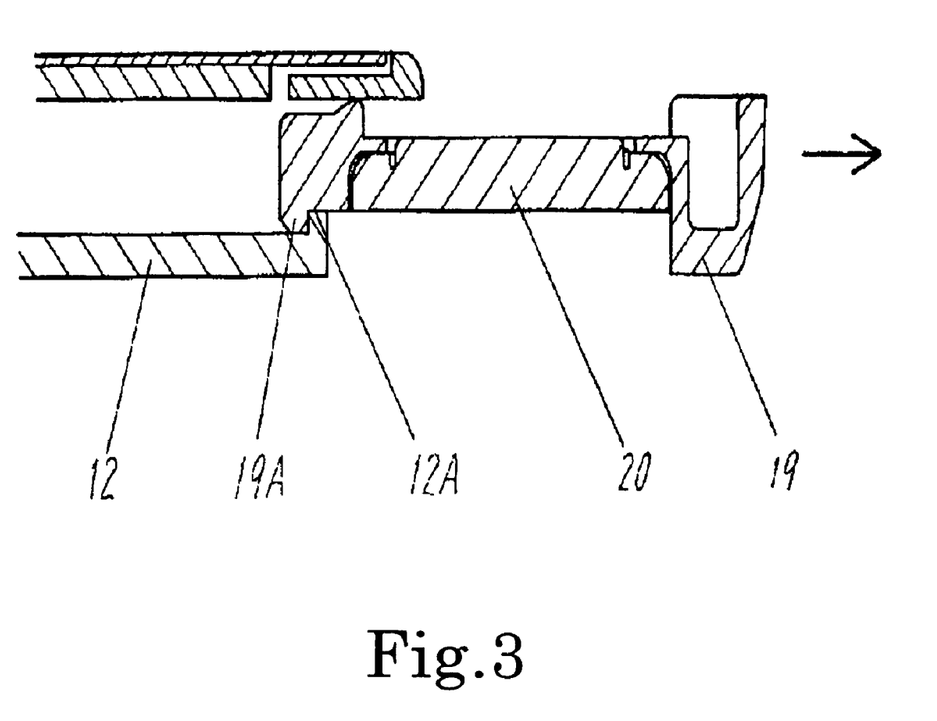
FIG. 3 is a side sectional view of a holder being pulled out of the remote-control transmitter.

Also, in case the button battery 20 is exhausted through long-time use, as shown in the side sectional view of FIG. 3, the holder 19 is pulled out of the lower casing 12 and the button battery 20 is replaced. In this case, the stopping portion 19A of the holder 19 abuts the stopping portion 12A of the lower casing 12, and therefore, the holder 19 is not completely detached from the lower casing 12. That is, when the holder 19 is pulled out, the stopping portion 12A is mated with the stopping portion 19A and both stopping portions are engaged each other.

That is, in this remote-control transmitter, the holder 19 is provided with the stopping portion 19A, and the lower casing 12 is provided with the stopping portion 12A, the battery is replaced in a state such that the end of the holder 19 is stopped by the lower casing 12. After that, the holder 19 is again inserted into the lower casing 12. In the case of this remote-control transmitter, the battery replacement is performed as described above.

Figure 4:
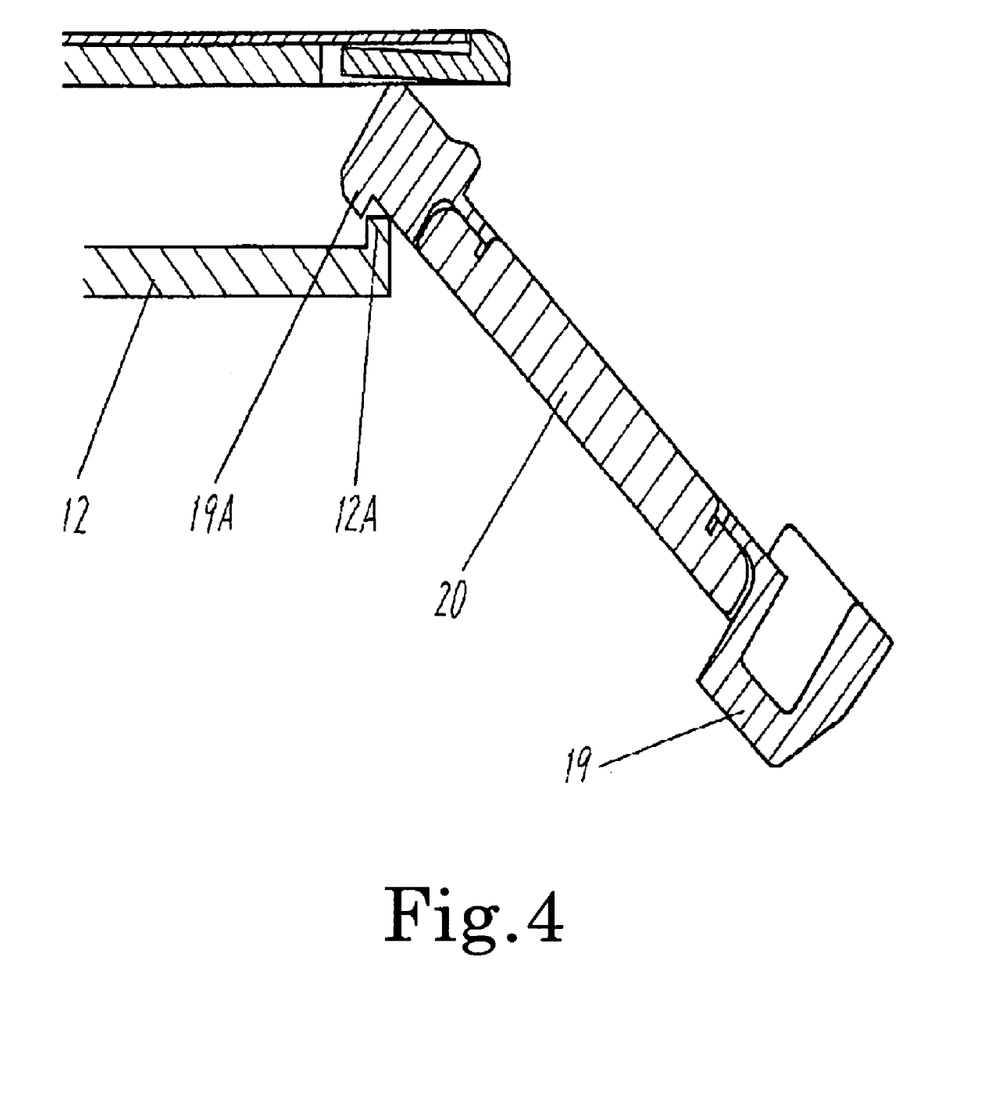
FIG. 4 is a side sectional view of the holder being assembled of the remote-control transmitter.

When assembling the remote-control transmitter, the holder 19 provided with the stopping portion 19A can be inserted into the lower casing 12 as shown in the side sectional view of FIG. 4. That is, with the holder 19 kept aslant downward, the stopping portion 19A is set to the inner side of the stopping portion 12A. After that, the insertion is completed when the holder 19 is shifted back to the position horizontal to the lower casing 12. Thus, when assembling, the holder 19 can be easily inserted into the lower casing 12.

As described above, in the case of the remote-control transmitter of the first preferred embodiment, the holder 19 is provided with the stopping portion 19A, and the lower casing 12 is provided with the stopping portion 12A, and with the holder 19 pulled out of the lower casing 12, the stopping portion 19A and the stopping portion 12A come in contact with each other. In this way, when the holder 19 is pulled out of the lower casing 12, the holder 19 is stopped at the specified position without being completely detached from the lower casing 12. Accordingly, in the first preferred embodiment, it is possible to obtain a remote-control transmitter which is free from dropping or losing of the holder during replacement of the battery.

(Second Preferred Embodiment)

The second preferred embodiment of the present invention will be described in the following.

In the remote-control transmitter in the second preferred embodiment of the present invention, same as in the first preferred embodiment shown in FIG. 1, upper casing 11 is formed with control section 14 where a plurality of control keys are arranged. Also, on printed circuit board 15 housed in the upper casing 11 and lower casing 12 is formed circuit 16 which generates and transmits remote-control signals for remote control of apparatuses.

Figure 5:
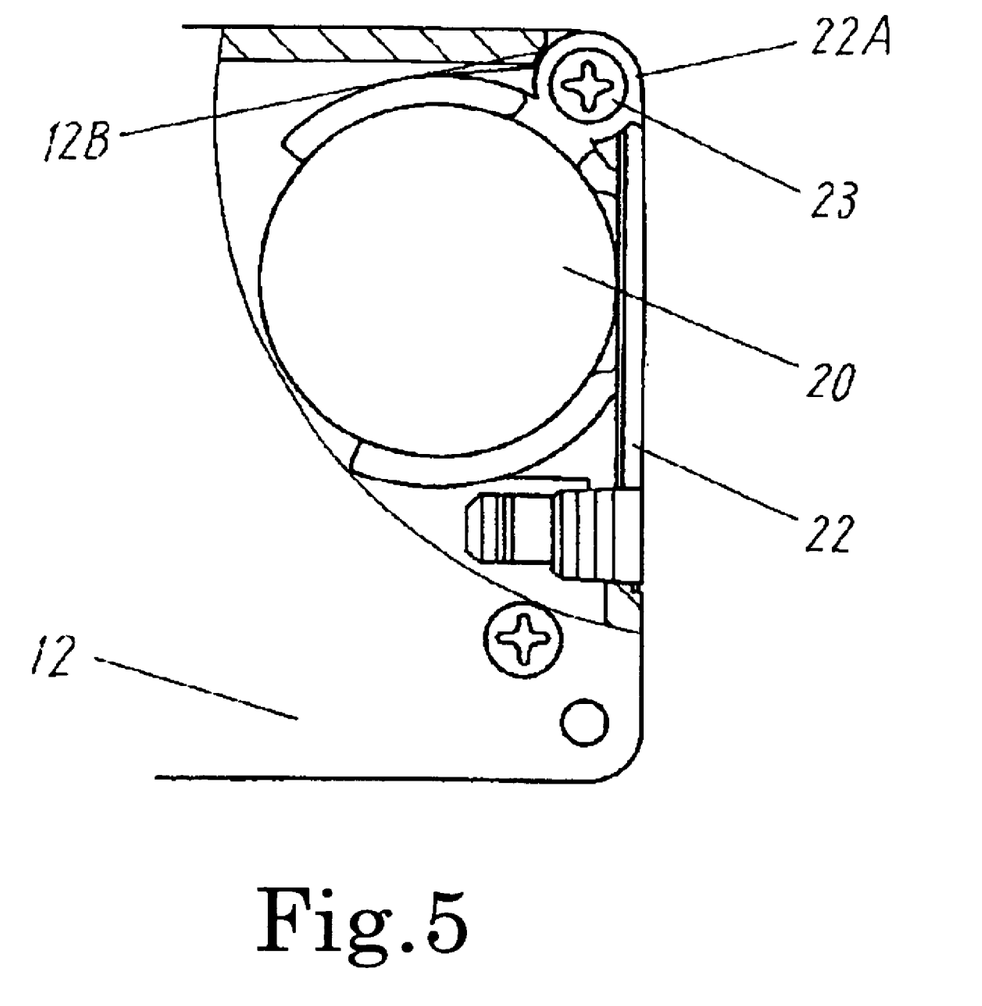
FIG. 5 is a partly plane sectional view of a remote-control transmitter in the second preferred embodiment of the present invention.

FIG. 5 is a partly plane sectional view as viewed from the rear side of the remote-control transmitter in the second preferred embodiment of the present invention. In FIG. 5, disk-like button battery 20 loaded in holder 22 made of synthetic resin comes in contact with an electrode (not shown) disposed on the printed circuit board 15 and is electrically connected to circuit 16.

Further, as shown in FIG. 5, in the second preferred embodiment, the holder 22 has shaft hole 22A at the end thereof. The holder 22 is rotatably held to the lower casing 12 by screw 23 and shaft hole 22A, and capable of sliding within the lower casing 12.

And, the lower casing 12 includes abutment 12B on which the side of holder 22 is abutted in the vicinity of the screw 23.

In the above configuration, when a specific control key of the control section 14 is pushed with the remote-control transmitter faced to an electronic apparatus, remote-control signal of infrared ray corresponding to the control key operated is transmitted from the circuit 16 to the electronic apparatus.

Figure 6:
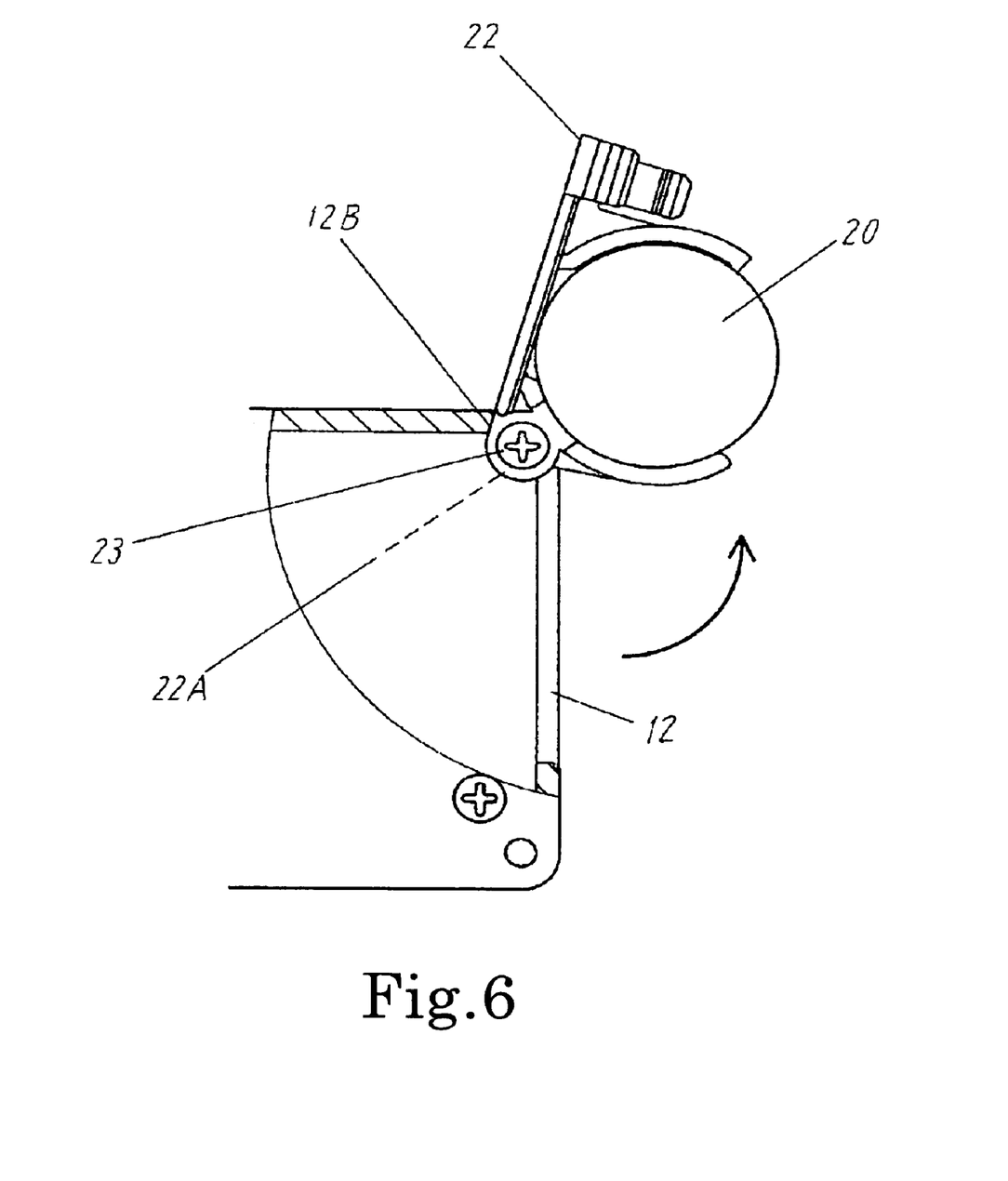
FIG. 6 is a partly plane sectional view with the holder pulled out of the remote-control transmitter.

Also, in case the button battery 20 is exhausted through long-time use, as shown in the partly plane sectional view of FIG. 6, the holder 22 is pulled out of the lower casing 12, and the button battery 20 is replaced. In this case, the holder 22 is rotated about shaft hole 22A supported by the screw 23. Since the holder 22 is in a state of being held to the lower casing 12, the holder 22 is not detached from the lower case 12.

That is, in the configuration of this remote-control transmitter, since the holder 22 is rotated about the shaft hole 22A and pulled out, the battery is replaced while the holder 22 is in a state of being supported by the screw 23. In the case of this remote-control transmitter, the battery replacement is performed as described above.

Further, the remote-control transmitter is provided with abutment 12B in the vicinity of the screw 23 of the lower casing 12. Accordingly, when the holder 22 is rotated by a specified angle, the side of holder 22 comes in contact with the abutment 12B and stops there.

Thus, according to the second preferred embodiment, since the holder 22 is rotatably held to the lower casing 12, it is possible to prevent dropping or losing of the holder 22 and to obtain a remote-control transmitter of which the battery 20 can be easily replaced.

Also, since the abutment 12B on which the holder 22 is abutted at a specified angle is provided between the holder 22 and the lower casing 12, it is possible to keep the holder 22 at a specified angle and to replace the battery 20 more easily.

As described above, the present invention brings about advantages such that it is possible to obtain a remote-control transmitter which is free from dropping or losing of the holder.

What is claimed is:

1. A remote-control transmitter, comprising:
   a circuit for generating remote-control signals;
   a casing for storing said circuit;
   a control section with a plurality of control keys arranged therein, which is formed at a top outer side of the casing; and
   a holder capable of loading a button battery and sliding within said casing, wherein the casing has a first side with an opening for receiving the holder and a second side adjacent to the first side, and
   wherein the holder is rotatably held to the casing, is rotatable about an inside of an intersection of the first side and the second side and extends beyond the second side of said casing when the holder is rotated to an opened position.

2. The remote-control transmitter of claim 1,
   wherein said holder has a shaft hole and is rotatably held to said casing and is rotatable about the shaft hole to move in and out of the casing.

3. The remote-control transmitter of claim 2,
   wherein an abutment on which the holder is abutted at a specified angle is provided between said holder and said casing.

4. The remote-control transmitter of claim 2, wherein said button battery is a disk-like button battery.

5. The remote-control transmitter of claim 3, wherein said button battery is a disk-like button battery.

* * * * *